US011978157B2

United States Patent
Jiang et al.

(10) Patent No.: US 11,978,157 B2
(45) Date of Patent: May 7, 2024

(54) METHOD AND APPARATUS FOR GENERATING THREE-DIMENSIONAL MODEL, DEVICE, AND STORAGE MEDIUM

(71) Applicant: Shining 3D Tech Co., Ltd., Zhejiang (CN)

(72) Inventors: Tengfei Jiang, Zhejiang (CN); Xiaobo Zhao, Zhejiang (CN)

(73) Assignee: Shining 3D Tech Co., Ltd., Zhejiangÿ (CN)

( * ) Notice: Subject to any disclaimer, the term of this patent is extended or adjusted under 35 U.S.C. 154(b) by 441 days.

(21) Appl. No.: 17/280,934

(22) PCT Filed: Sep. 29, 2019

(86) PCT No.: PCT/CN2019/109202
§ 371 (c)(1),
(2) Date: Mar. 29, 2021

(87) PCT Pub. No.: WO2020/063986
PCT Pub. Date: Apr. 2, 2020

(65) Prior Publication Data
US 2021/0375043 A1 Dec. 2, 2021

(30) Foreign Application Priority Data
Sep. 30, 2018 (CN) .......................... 201811160166.4

(51) Int. Cl.
*G06T 15/00* (2011.01)
*G06N 3/08* (2023.01)
(Continued)

(52) U.S. Cl.
CPC .............. *G06T 17/00* (2013.01); *G06N 3/08* (2013.01); *G06T 7/0012* (2013.01); *G06T 7/529* (2017.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 9,282,321 B2 * 3/2016 Sandrew ............... G06T 15/205
2004/0104935 A1 * 6/2004 Williamson ........... G06V 10/10
715/757
(Continued)

FOREIGN PATENT DOCUMENTS

CN 101686407 A 3/2010
CN 102945565 A 2/2013
(Continued)

OTHER PUBLICATIONS

First examination report of family KR application dated Oct. 18, 2022.
(Continued)

*Primary Examiner* — Gordon G Liu
(74) *Attorney, Agent, or Firm* — Samson G. Yu (57) ABSTRACT

The present disclosure relates to a method and an apparatus for generating a three-dimensional model, a device, and a storage medium. The method includes: a scanned texture image and a depth image corresponding to the texture image are acquired; the texture image is processed by a pre-trained mask region convolutional neural network to determine at least one region of interest on the texture image and category information and mask information of each of the at least one region of interest; the depth image is updated according to the category information and the mask information of each of the at least one region of interest to obtain a updated depth image; and a three-dimensional model corresponding to the updated depth image is constructed.

18 Claims, 3 Drawing Sheets

(51) Int. Cl.

| | | |
|---|---|---|
| *G06T 7/00* | (2017.01) | |
| *G06T 7/529* | (2017.01) | |
| *G06T 17/00* | (2006.01) | |
| *G06T 17/10* | (2006.01) | |
| *G06V 10/25* | (2022.01) | |
| *G06V 10/764* | (2022.01) | |
| *G06V 10/774* | (2022.01) | |
| *G06V 10/82* | (2022.01) | |
| *G06V 20/64* | (2022.01) | |

(52) U.S. Cl.
CPC .............. *G06T 17/10* (2013.01); *G06V 10/25* (2022.01); *G06V 10/764* (2022.01); *G06V 10/774* (2022.01); *G06V 10/82* (2022.01); *G06V 20/653* (2022.01); *G06T 2207/30036* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 2014/0378810 | A1* | 12/2014 | Davis .................... | G06F 16/245 600/407 |
| 2015/0015045 | A1 | 1/2015 | Uebelacker et al. | |
| 2015/0150457 | A1 | 6/2015 | Wu et al. | |
| 2019/0096064 | A1* | 3/2019 | Yang ........................ | G06T 11/60 |

FOREIGN PATENT DOCUMENTS

| | | |
|---|---|---|
| CN | 106056071 A | 10/2016 |
| CN | 106096561 A | 11/2016 |
| CN | 106780512 A | 5/2017 |
| CN | 106802138 A | 6/2017 |
| CN | 107301662 A | 10/2017 |
| CN | 107358648 A | 11/2017 |
| CN | 107491459 A | 12/2017 |
| CN | 107644454 A | 1/2018 |
| CN | 108154550 A | 6/2018 |
| CN | 108269300 A | 7/2018 |
| CN | 108447082 A | 8/2018 |
| CN | 101388115 A | 3/2019 |
| CN | 109410318 A | 3/2019 |
| EP | 3675037 A1 | 7/2020 |
| JP | 2017504370 A | 2/2017 |
| KR | 10-2016-0092013 A | 8/2016 |
| KR | 20180004635 A | 1/2018 |
| KR | 10-1840563 B1 | 3/2018 |
| WO | 2018073824 A1 | 4/2018 |
| WO | 2018-140596 A2 | 8/2018 |
| WO | 2018140596 A2 | 8/2018 |

OTHER PUBLICATIONS

First examination report of family KR application dated Apr. 26, 2023.

Second examination report of family JP application No. 2021-517414, dated Dec. 6, 2022.

Serialization 54th. The world seen by machines—the future created by computer vision. General Object Recognition by Deep Learning (3)—Fast R-CNN. Publication date: Jul. 24, 2018.

Editing history of "Object detection by deep learning with deep understanding by Keras"—Qiita Jun. 24, 2017 18:01 (JST).

First examination report of family Indian application No. 202147018588, dated Feb. 10, 2022.

He, Kaiming et al. "Mask R-CNN". IEEE. Dec. 25, 2017. ISSN: 2380-7504. pp. 2980-2988.

Feng, Zhijian et al."Research on Retrieval Algorithm of 3D Model Reconstruction Based on Deep Learning". FUJIAN Computer. Dec. 30, 2017. pp. 9-11.

Quang-Hieu Pham et al. "Real-time Progressive 3D Semantic Segmentation for Indoor Scenes". Apr. 1, 2018 (Apr. 1, 2018), pp. 1-16, XP055637841.

Saurabh Gupta et al."Learning Rich Features from RGB-D Images for Object Detection and Segmentation". In:"ICIAP: International Conference on Image Analysis and Processing, 17th international Conference, Naples, Italy, Sep. 9-13, 2013. Proceedings", Jan. 1, 2014(Jan. 1, 2014), Springer, Berlin, Heidelberg 032548, XP055445798. ISBN:978-3-642-17318-9. vol. 8695, pp. 345-360.

Extended European search report of family EP application dated Sep. 5, 2021.

First examination report of family JP application No. 2021-517414, dated May 10, 2022.

First examination report of family CA application No. 3,114,650, dated May 6, 2022.

* cited by examiner

METHOD AND APPARATUS FOR GENERATING THREE-DIMENSIONAL MODEL, DEVICE, AND STORAGE MEDIUM

The present disclosure claims the priority of Chinese Patent Application No. 201811160166.4, entitled "Method and Apparatus for Generating Three-Dimensional Model, Device, and Storage Medium", and filed with the State Intellectual Property Office of P. R. China on Sep. 30, 2018, and the entire content of the above-referenced application is incorporated herein by reference.

TECHNICAL FIELD

The present disclosure relates to the technical field of three-dimensional scanning, and in particular to a method and an apparatus for generating a three-dimensional model, a device, and a storage medium.

BACKGROUND

A three-dimensional model is used for representing a three-dimensional structure and shape of a real object. Usually, the three-dimensional model of the real object is constructed through scanning a depth image of the real object, and then, processing the depth image by a three-dimensional modeling tool. The three-dimensional model has broad application prospects in fields of medical treatment, architecture, electronic games, and the like.

However, when the depth image of the real object is scanned, certain unnecessary data is often scanned, and the unnecessary data easily affects the accuracy of construction of the three-dimensional model. For example, when the inside of a mouth of a user is scanned by an intraoral scanner, in addition to the three-dimensional data of teeth and gingivae, the three-dimensional data of tongue is also scanned, and this three-dimensional data will interfere with construction of a three-dimensional model of teeth.

SUMMARY

At least some embodiments of the present disclosure provide a method and an apparatus for generating a three-dimensional model, a device, and a storage medium, so as at least to partially solve the above technical problems and improve the accuracy of the three-dimensional model.

In an embodiment of the present disclosure, a method for generating a three-dimensional model is provided, and the method includes: acquiring a texture image and a depth image corresponding to the texture image; processing the texture image by a pre-trained mask region convolutional neural network to determine at least one region of interest on the texture image and category information and mask information of each of the at least one region of interest; updating the depth image according to the category information and the mask information of each of the at least one region of interest to obtain a updated depth image; and constructing a three-dimensional model corresponding to the updated depth image.

In an optional embodiment, the category information of each of the at least one region of interest includes a category value of each preset category; the mask information of each of the at least one region of interest includes a mask image of each preset category; and each preset category includes a positive sample category and a negative sample category.

In an optional embodiment, an operation of updating the depth image according to the category information and the mask information of each of the at least one region of interest includes: determining a region category of each of the at least one region of interest in the category information of each of the at least one region of interest; when the region category is the positive sample category, acquiring a mask image of the region category in the mask information of each of the at least one region of interest, and determining the mask image of the region category as the mask image of each of the at least one region of interest; and updating the depth image according to the mask image of each of the at least one region of interest.

In an optional embodiment, an operation of updating the depth image according to the category information and the mask information of each of the at least one region of interest further includes: when the region category is the negative sample category, clearing depth information corresponding to each of the at least one region of interest in the depth image.

In an optional embodiment, an operation of updating the depth image according to the category information and the mask information of each of the at least one region of interest further includes: acquiring remaining image regions in the texture image excluding the at least one region of interest; and clearing depth information corresponding to the remaining image regions in the depth image.

In an optional embodiment, before acquiring the texture image and the depth image corresponding to the texture image, the method further includes: acquiring a sample image set, and labeling a sample image in the sample image set with a region type to obtain an image region of the preset category in the sample image; inputting the sample image into the mask region convolutional neural network to determine at least one sample region of interest on the sample image and category information and mask information of each of the at least one sample region of interest; and training the mask region convolutional neural network according to the image region of the preset category in the sample image and the category information and the mask information of each of the at least one sample region of interest.

In an optional embodiment, an operation of determining the at least one sample region of interest on the sample image and the category information and the mask information of each of the at least one sample region of interest includes: extracting a characteristic pattern of the sample image; determining at least one proposal region on the characteristic pattern, and selecting the at least one sample region of interest from the at least one proposal region; and processing the at least one sample region of interest by a preset region characteristic aggregation manner and a preset fully connected convolutional neural network to generate the category information and the mask information of each of the at least one sample region of interest.

In another embodiment of the present disclosure, an apparatus for generating a three-dimensional model is provided, and the apparatus includes: an image acquisition module, configured to acquire a texture image and a depth image corresponding to the texture image; a texture image processing module, configured to process the texture image by a pre-trained mask region convolutional neural network to determine at least one region of interest on the texture image and category information and mask information of each of the at least one region of interest; a depth image updating module, configured to update the depth image according to the category information and the mask information of each of the at least one region of interest to obtain a updated depth image; and a model constructing module, configured to construct a three-dimensional model corresponding to the updated depth image.

In another embodiment of the present disclosure, a computer device is provided, which includes a memory and a processor. The memory is configured to store a computer program, and the processor is configured to execute the computer program to implement the following steps:

acquiring a texture image and a depth image corresponding to the texture image;

processing the texture image by a pre-trained mask region convolutional neural network to determine at least one region of interest on the texture image and category information and mask information of each of the at least one region of interest;

updating the depth image according to the category information and the mask information of each of the at least one region of interest to obtain a updated depth image; and constructing a three-dimensional model corresponding to the updated depth image.

In another embodiment of the present disclosure, a computer-readable storage medium is provided, and a computer program is stored on the computer-readable storage medium. When the computer program is executed by a processor, the following steps are implemented:

acquiring a texture image and a depth image corresponding to the texture image;

processing the texture image by a pre-trained mask region convolutional neural network to determine at least one region of interest on the texture image and category information and mask information of each of the at least one region of interest;

updating the depth image according to the category information and the mask information of each of the at least one region of interest to obtain a updated depth image; and constructing a three-dimensional model corresponding to the updated depth image.

Through the method and the apparatus for generating the three-dimensional model, the device, and the storage medium described above, the at least one region of interest is extracted from the texture image by the trained mask convolutional neural network; the depth image corresponding to the texture image is updated according to the category information and the mask information of each of the at least one region of interest; and the three-dimensional model corresponding to the updated depth image is constructed, thereby improving an effect of noise data removal in the depth image and improving the accuracy of the three-dimensional model.

DETAILED DESCRIPTION

The present disclosure is further detailed with reference to the accompanying drawings and the embodiments to make the objectives, technical solutions and advantages of the present disclosure more clearly. It should be understood that the specific embodiments described here are used for explaining the present disclosure, rather than limiting the present disclosure.

Figure 1:
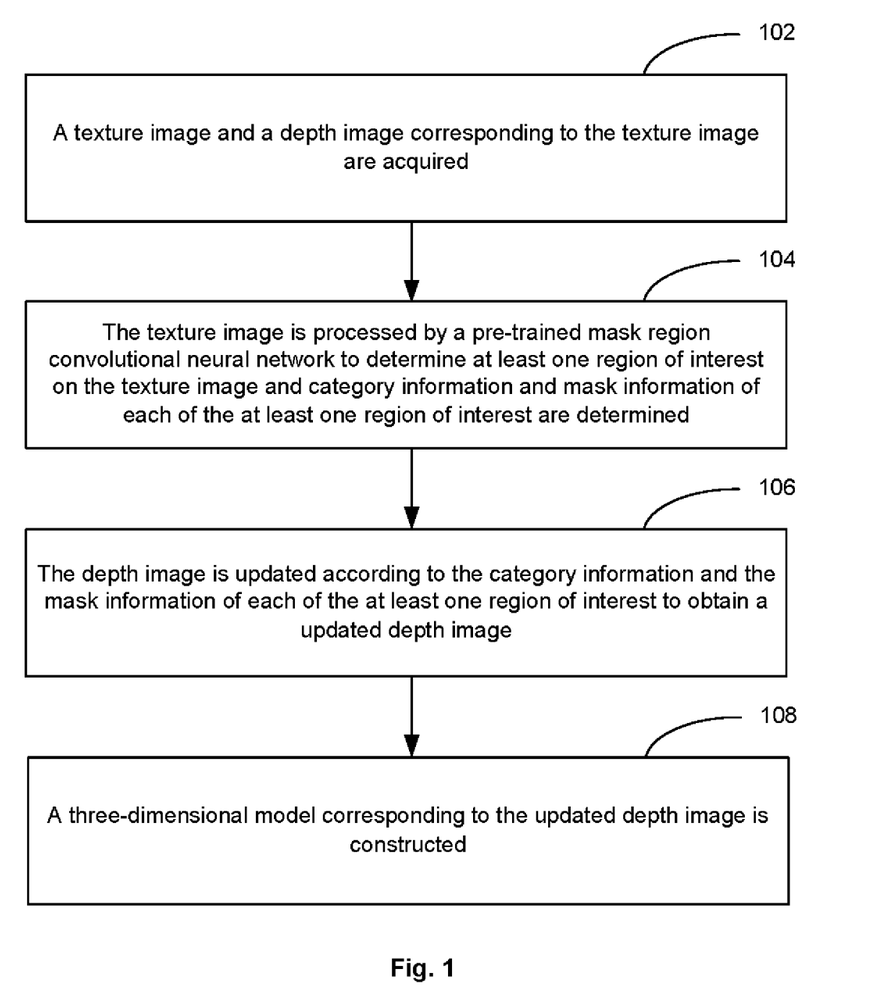
FIG. 1 is a schematic flowchart of a method for generating a three-dimensional model in an embodiment of the present disclosure.

In an optional embodiment, as shown in FIG. 1, a method for generating a three-dimensional model is provided. The method includes the following steps.

At Step 102, a texture image and a depth image corresponding to the texture image are acquired.

Specifically, the texture image scanned by a three-dimensional scanning device and the depth image corresponding to the texture image are acquired. Texture information of a scanning target is recorded on the texture image, and depth information corresponding to each pixel point on the texture image is recorded on the depth image.

At Step 104, the texture image is processed by a pre-trained mask region convolutional neural network to determine at least one region of interest on the texture image and category information and mask information of each of the at least one region of interest are determined.

A mask region convolutional neural network (Mask R-CNN) evolved from a region convolutional neural network (R-CNN) is an image target detection and segmentation algorithm. Each of the at least one region of interest (ROI) is at least one image region that needs to be processed in the texture image, and data required to construct a three-dimensional model may be existed in each of the at least one region of interest.

Specifically, the mask region convolutional neural network is pre-trained. The texture image is input into the mask region convolutional neural network to output the at least one region of interest on the texture image and the category information and the mask information of each of the at least one region of interest.

The category information of each of the at least one region of interest includes a category value of each preset category, and whether each of the at least one region of interest belongs to the preset category can be determined according to the category value of each preset category. The mask information of each of the at least one region of interest includes a mask image of each preset category, and the mask image of each preset category is a binary mask image.

In an optional embodiment, the preset category is divided into a positive sample category and a negative sample category. Each region of interest belonging to the positive sample category includes useful data for constructing the three-dimensional model, and each region of interest belonging to the negative sample category includes noise data that easily interferes with the three-dimensional model. Therefore, the accuracy of the three-dimensional model is improved by subsequently performing corresponding processing on each of the at least one region of interest belonging to different preset categories.

At Step 106, the depth image is updated according to the category information and the mask information of each of the at least one region of interest to obtain a updated depth image.

Specifically, since the category information of each of the at least one region of interest includes the category value of each preset category, the preset category to which each of the at least one region of interest belongs can be determined according to the category value of each preset category, and the preset category to which each of the at least one region of interest belongs is the region category of each of the at least one region of interest.

In an optional embodiment, the category value of each preset category is 0 or 1. When the category value of any one preset category corresponding to a region of interest is 0, it is considered that the region of interest does not belong to this preset category. When the category value of any one preset category corresponding to a region of interest is 1, it is considered that the region of interest belongs to this preset category, thereby accurately determining the region category of each of the at least one region of interest.

Specifically, after the region category of each of the at least one region of interest is determined, the mask image of each region category is acquired from the mask information of each of the at least one region of interest, and the mask image of the region category is determined as the mask image of each of the at least one region of interest. The depth information corresponding to each of the at least one region of interest on the depth image is updated according to the region category of each of the at least one region of interest and the mask image of each of the at least one region of interest, so as to remove the depth information corresponding to each region of interest belonging to the negative sample category, and include the depth information of each region of interest belonging to the positive sample category.

At Step 108, a three-dimensional model corresponding to the updated depth image is constructed.

Specifically, according to the region category and the mask image of each of the at least one region of interest, three-dimensional model construction is performed by a preset three-dimensional reconstruction algorithm and the updated depth image, so as to obtain a constructed three-dimensional model. There is no specific limitation on the three-dimensional reconstruction algorithm here.

Through the above-mentioned method for generating the three-dimensional model, the texture image is processed by the trained mask region convolutional neural network; the at least one region of interest on the texture image and the category information and the mask information of each of the at least one region of interest are determined; the region category and the mask image of each of the at least one region of interest are determined; and the depth image is processed according to the region category and the mask image of each of the at least one region of interest, thereby improving the effects of noise data removal and effective data retention in the depth image and improving the accuracy of three-dimensional model reconstruction.

In an optional embodiment, during a process of updating the depth image, when the region category of one region of interest is the positive sample category, a mask operation is performed on the mask image and the depth image of this region of interest to obtain the updated depth image, thereby effectively retaining the depth information corresponding to the positive sample category in the depth image. The mask operation may be to multiply a mask value of one region in the mask image with a depth value of this region in the depth image.

In an optional embodiment, during a process of updating the depth image, when the region category of one region of interest is the negative sample category, the depth information corresponding to this region of interest in the depth image is cleared, so as to effectively remove the depth information corresponding to the negative sample category in the depth image. A depth image region corresponding to this region of interest in the depth image can be determined first, and then, a depth value of the depth image region can be removed. In addition, the mask value in the mask image of this region of interest can be set to zero first, and then, a mask operation is performed on the updated mask image and the depth image.

In an optional embodiment, during a process of updating the depth image, remaining image regions in the texture image excluding the at least one region of interest are acquired, and the depth information corresponding to the remaining image regions in the depth image is cleared, so as to effectively prevent the depth information corresponding to the remaining image regions from interfering with the construction of the three-dimensional model.

In an optional embodiment, the texture image and the depth image are respectively a tooth texture image and a tooth depth image. The positive sample category includes a gingiva category and a tooth category, and the negative sample category includes a tongue category and a tongue buccal category, so that it is convenient to process the image data of the tongue and the buccal side of the tongue that are likely to interfere with the construction process of the three-dimensional model in the oral cavity, so as to improve the accuracy of the three-dimensional model.

In an optional embodiment, when the tooth texture image is input into the mask region convolutional neural network, at least one region of interest on the tooth depth image and category information and mask information corresponding to each of the at least one region of interest are acquired. The category information of each of the at least one region of interest includes the category values of the gingiva category, the tooth category, the tongue category and the tongue buccal category; and the mask information of each of the at least one region of interest includes the mask images of the gingiva category, the tooth category, the tongue category and the tongue buccal category. According to the category values of the gingiva category, the tooth category, the tongue category and the tongue buccal category, the region category to which each of the at least one region of interest belongs is determined, and the mask image of this region category is set as the mask image of each of the at least one region of interest, thereby performing a comparatively accurate determination on the category of each of the at least one region of interest. As an example, when the region category to which a region of interest belongs is the gingiva category, the mask image of this region of interest corresponding to the gingiva category is set as the mask image of this region of interest.

In an optional embodiment, since the tooth category and the gingiva category belong to the positive sample category and the tongue category and the tongue buccal category belong to the negative sample category, when a region of interest belongs to the tooth category or the gingiva category, a mask operation is performed on the mask image and the depth image of this region of interest. And when a region of interest belongs to the tongue category or the tongue buccal category, the depth information corresponding to this region of interest in the depth image is cleared, thereby effectively retaining the depth information corresponding to the positive sample category in the depth image, and effectively removing the depth information corresponding to the negative sample category in the depth image.

Figure 2:
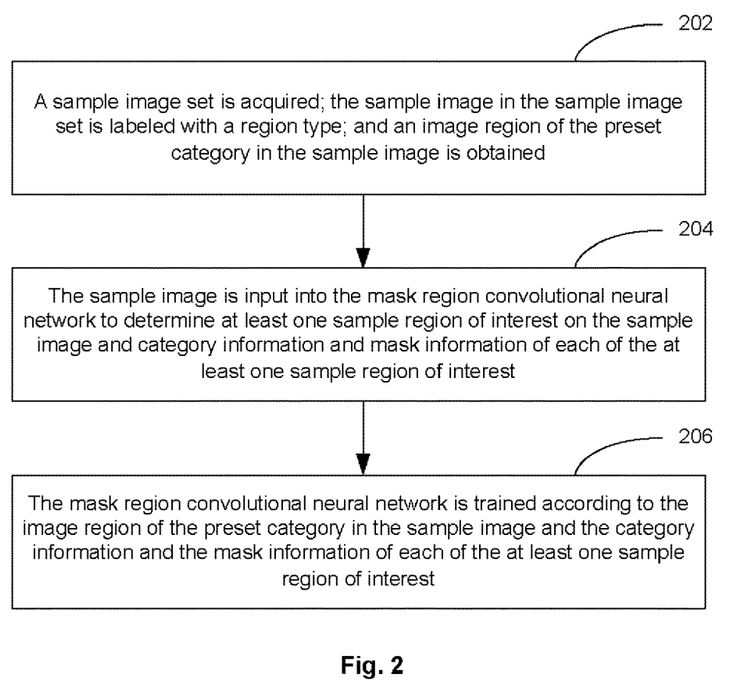
FIG. 2 is a schematic flowchart of a training process of a mask region convolutional neural network in a method for generating a three-dimensional model in an optional embodiment of the present disclosure.

In another optional embodiment, as shown in FIG. 2, a training process of a mask region convolutional neural network in a method for generating a three-dimensional model is provided. The training process includes the following steps.

At Step 202, a sample image set is acquired; the sample image in the sample image set is labeled with a region type; and an image region of the preset category in the sample image is obtained.

Specifically, the sample image in the sample image set is a texture image of an object of the same type as a scanning target. After the sample image set is obtained, the sample image in the sample image set can be subjected to region labeling to obtain the image region of the preset category in the sample image. A lableme image labeling tool can be used for performing region labeling on the sample image.

In an optional embodiment, the preset category is divided into a positive sample category and a negative sample category, thereby improving the training effect of the mask region convolutional neural network.

In an optional embodiment, when scanning targets are teeth, tooth texture images of people in different ages can be collected. For example, the age range from 0 to 80 years old is divided into 8 groups according to each age group of 10 years old, and texture images with a male to female ratio of 1:1 are collected for each age group.

At Step 204, the sample image is input into the mask region convolutional neural network to determine at least one sample region of interest on the sample image and category information and mask information of each of the at least one sample region of interest.

Specifically, the sample image is processed by the mask region convolutional neural network to obtain the at least one sample region of interest on the sample image and the category information and the mask information of each of the at least one sample region of interest.

At Step 206, the mask region convolutional neural network is trained according to the image region of the preset category in the sample image and the category information and the mask information of each of the at least one sample region of interest.

Specifically, since the category information of each of the at least one sample region of interest includes the category value of each preset category, the preset category to which each of the at least one sample region of interest belongs can be determined according to the category value of each preset category. After the preset category to which each of the at least one sample region of interest belongs (namely, the region category of each of the at least one sample region of interest) is determined, each of the at least one sample region of interest can be compared with the image region of the preset category in the sample image to obtain an error of the training process of the mask region convolutional neural network. Network parameters of the mask region convolutional neural network are adjusted according to the error. And the network parameters of the mask region convolutional neural network are adjusted multiple times to realize supervised training of the mask region convolutional neural network.

In an optional embodiment, before the sample image is input into the mask region convolutional neural network, image processing operations are performed on the sample image. The image processing operations include brightness consistency processing and de-averaging processing, so as to improve the training effect of the mask region convolutional neural network.

In an optional embodiment, when the sample image is input into the mask region convolutional neural network, a characteristic pattern of the sample image is extracted by a deep residual neural network (ResNet neural network) in the mask region convolutional neural network. At least one proposal region with a preset size is set for each characteristic point of the characteristic pattern. The at least one proposal region is input into a region proposal network (RPN) in the mask region convolutional neural network; and binary classification and border regression are performed to select the at least one proposal region, so as to obtain the at least one sample region of interest of the sample image. Then, each of the at least one region of interest is processed by a preset region characteristic aggregation manner to determine the category information of each of the at least one region of interest; and the mask information of each of the at least one region of interest is generated by a fully connected convolutional neural network operation in the mask region convolutional neural network. The region characteristic aggregation manner is an ROI Align manner of the mask region convolutional neural network.

It should be understood that although various steps in the flowcharts of FIG. 1 and FIG. 2 are displayed in sequence as indicated by arrows, these steps are not necessarily executed in sequence according to the order indicated by the arrows. Unless there is a clear description herein, there is no strict order limitation on the execution of these steps, and these steps can be executed in other orders. Furthermore, at least a part of the steps in FIG. 1 and FIG. 2 may include multiple sub-steps or multiple stages; these sub-steps or stages are not necessarily executed and completed at the same time, but can be executed at different times, and these sub-steps or stages are not necessarily performed in sequence, but may be performed in turn or alternately with other steps or at least a part of the sub-steps or stages of other steps.

Figure 3:
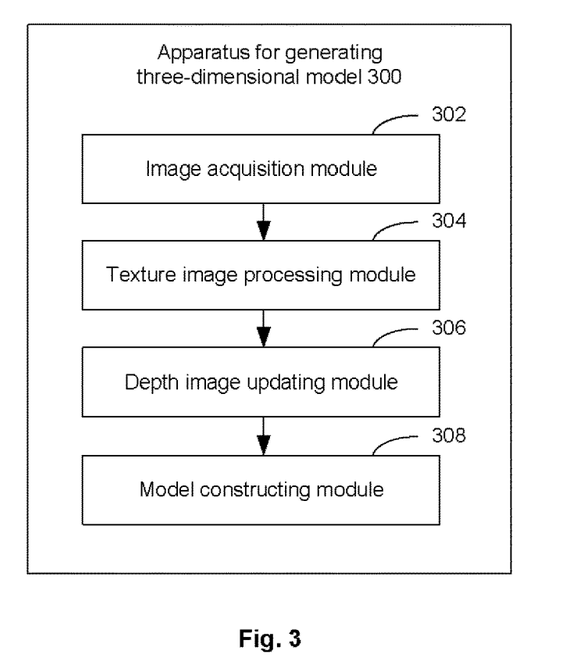
FIG. 3 is a structural block diagram of an apparatus for generating a three-dimensional model in an embodiment of the present disclosure.

In an optional embodiment, as shown in FIG. 3, an apparatus 300 for generating a three-dimensional model is provided. The apparatus includes: an image acquisition module 302, a texture image processing module 304, a depth image updating module 306 and a model constructing module 308.

The image acquisition module 302 is configured to acquire a texture image and a depth image corresponding to the texture image.

Specifically, the texture image scanned by a three-dimensional scanning device and the depth image corresponding to the texture image are acquired. Texture information of a scanning target is recorded on the texture image, and depth information corresponding to each pixel point on the texture image is recorded on the depth image.

The texture image processing module 304 is configured to process the texture image by a pre-trained mask region convolutional neural network to determine at least one region of interest on the texture image and category information and mask information of each of the at least one region of interest.

A mask region convolutional neural network (Mask R-CNN) evolved from a region convolutional neural network (R-CNN) is an image target detection and segmentation algorithm. Each of the at least one region of interest (ROI) is at least one image region that needs to be processed in the texture image, and data required to construct a three-dimensional model may be existed in each of the at least one region of interest.

S Specifically, the mask region convolutional neural network is pre-trained. The texture image is input into the mask region convolutional neural network to output the at least one region of interest on the texture image and the category information and the mask information of each of the at least one region of interest.

The category information of each of the at least one region of interest includes a category value of each preset category, and whether each of the at least one region of interest belongs to the preset category can be determined according to the category value of each preset category. The mask information of each of the at least one region of interest includes a mask image of each preset category, and the mask image of each preset category is a binary mask image.

In an optional embodiment, the preset category is divided into a positive sample category and a negative sample category. Each region of interest belonging to the positive sample category includes useful data for constructing the three-dimensional model, and each region of interest belonging to the negative sample category includes noise data that easily interferes with the three-dimensional model. Therefore, the accuracy of the three-dimensional model is improved by subsequently performing corresponding processing on each of the at least one region of interest belonging to different preset categories.

The depth image updating module 306 is configured to update the depth image according to the category information and the mask information of each of the at least one region of interest to obtain a updated depth image.

Specifically, since the category information of each of the at least one region of interest includes the category value of each preset category, the preset category to which each of the at least one region of interest belongs can be determined according to the category value of each preset category, and the preset category to which each of the at least one region of interest belongs is the region category of each of the at least one region of interest.

In an optional embodiment, the category value of each preset category is 0 or 1. When the category value of any one preset category corresponding to a region of interest is 0, it is considered that the region of interest does not belong to this preset category. When the category value of any one preset category corresponding to a region of interest is 1, it is considered that the region of interest belongs to this preset category, thereby accurately determining the region category of each of the at least one region of interest.

Specifically, after the region category of each of the at least one region of interest is determined, the mask image of each region category is acquired from the mask information of each of the at least one region of interest, and the mask image of the region category is determined as the mask image of each of the at least one region of interest. The depth information corresponding to each of the at least one region of interest on the depth image is updated according to the region category of each of the at least one region of interest and the mask image of each of the at least one region of interest, so as to remove the depth information corresponding to each region of interest belonging to the negative sample category, and include the depth information of each region of interest belonging to the positive sample category.

The model constructing module 308 is configured to construct a three-dimensional model corresponding to the updated depth image.

Specifically, according to the region category and the mask image of each of the at least one region of interest, three-dimensional model construction is performed by a preset three-dimensional reconstruction algorithm and the updated depth image, so as to obtain a constructed three-dimensional model. There is no specific limitation on the three-dimensional reconstruction algorithm here.

Through the above-mentioned apparatus for generating the three-dimensional model, the texture image is processed by the trained mask region convolutional neural network; the at least one region of interest on the texture image and the category information and the mask information of each of the at least one region of interest are determined; the region category and the mask image of each of the at least one region of interest are determined; and the depth image is processed according to the region category and the mask image of each of the at least one region of interest, thereby improving the effects of noise data removal and effective data retention in the depth image and improving the accuracy of three-dimensional model reconstruction.

In an optional embodiment, during a process of updating the depth image, when the region category of one region of interest is the positive sample category, a mask operation is performed on the mask image and the depth image of this region of interest to obtain the updated depth image, thereby effectively retaining the depth information corresponding to the positive sample category in the depth image. The mask operation may be to multiply a mask value of one region in the mask image with a depth value of this region in the depth image.

In an optional embodiment, during a process of updating the depth image, when the region category of one region of interest is the negative sample category, the depth information corresponding to this region of interest in the depth image is cleared, so as to effectively remove the depth information corresponding to the negative sample category in the depth image. A depth image region corresponding to this region of interest in the depth image can be determined first, and then, a depth value of the depth image region can be removed. In addition, the mask value in the mask image of this region of interest can be set to zero first, and then, a mask operation is performed on the updated mask image and the depth image.

In an optional embodiment, during a process of updating the depth image, remaining image regions in the texture image excluding the at least one region of interest are acquired, and the depth information corresponding to the remaining image regions in the depth image is cleared, so as to effectively prevent the depth information corresponding to the remaining image regions from interfering with the construction of the three-dimensional model.

In an optional embodiment, the texture image and the depth image are respectively a tooth texture image and a tooth depth image. The positive sample category includes a gingiva category and a tooth category, and the negative sample category includes a tongue category and a tongue buccal category, so that it is convenient to process the image data of the tongue and the buccal side of the tongue that are likely to interfere with the construction process of the three-dimensional model in the oral cavity, so as to improve the accuracy of the three-dimensional model.

In an optional embodiment, when the tooth texture image is input into the mask region convolutional neural network, at least one region of interest on the tooth depth image and category information and mask information corresponding to each of the at least one region of interest are acquired. The category information of each of the at least one region of interest includes the category values of the gingiva category, the tooth category, the tongue category and the tongue buccal category; and the mask information of each of the at least one region of interest includes the mask images of the gingiva category, the tooth category, the tongue category and the tongue buccal category. According to the category values of the gingiva category, the tooth category, the tongue category and the tongue buccal category, the region category to which each of the at least one region of interest belongs is determined, and the mask image of this region category is set as the mask image of each of the at least one region of interest, thereby performing a comparatively accurate determination on the category of each of the at least one region of interest. As an example, when the region category to which a region of interest belongs is the gingiva category, the mask image of this region of interest corresponding to the gingiva category is set as the mask image of this region of interest.

In an optional embodiment, since the tooth category and the gingiva category belong to the positive sample category and the tongue category and the tongue buccal category belong to the negative sample category, when a region of interest belongs to the tooth category or the gingiva category, a mask operation is performed on the mask image and the depth image of this region of interest. And when a region of interest belongs to the tongue category or the tongue buccal category, the depth information corresponding to this region of interest in the depth image is cleared, thereby effectively retaining the depth information corresponding to the positive sample category in the depth image, and effectively removing the depth information corresponding to the negative sample category in the depth image.

In an optional embodiment, when the mask region convolutional neural network is trained, a sample image set is acquired; the sample image in the sample image set is labeled with a region type; and an image region of the preset category in the sample image is obtained. The sample image is input into the mask region convolutional neural network to determine at least one sample region of interest on the sample image and category information and mask information of each of the at least one sample region of interest. And the mask region convolutional neural network is trained according to the image region of the preset category in the sample image and the category information and the mask information of each of the at least one sample region of interest, thereby performing supervised training on the mask region convolutional neural network, so as to improve the training effect of the mask region convolutional neural network.

The sample image in the sample image set is a texture image of an object of the same type as a scanning target. After the sample image set is obtained, the sample image in the sample image set can be subjected to region labeling to obtain the image region of the preset category in the sample image. After the preset category to which each of the at least one sample region of interest belongs is determined, each of the at least one sample region of interest can be compared with the image region of the preset category in the sample image to obtain an error of the training process of the mask region convolutional neural network. Network parameters of the mask region convolutional neural network are adjusted according to the error. And the network parameters of the mask region convolutional neural network are adjusted multiple times to realize supervised training of the mask region convolutional neural network.

In an optional embodiment, before the sample image is input into the mask region convolutional neural network, image processing operations are performed on the sample image. The image processing operations include brightness consistency processing and de-averaging processing, so as to improve the training effect of the mask region convolutional neural network.

In an optional embodiment, when the sample image is input into the mask region convolutional neural network, a characteristic pattern of the sample image is extracted by a deep residual neural network (ResNet neural network) in the mask region convolutional neural network. At least one proposal region with a preset size is set for each characteristic point of the characteristic pattern. The at least one proposal region is input into a region proposal network (RPN) in the mask region convolutional neural network; and binary classification and border regression are performed to select the at least one proposal region, so as to obtain the at least one sample region of interest of the sample image. Then, each of the at least one region of interest is processed by a preset region characteristic aggregation manner to determine the category information of each of the at least one region of interest; and the mask information of each of the at least one region of interest is generated by a fully connected convolutional neural network operation in the mask region convolutional neural network. The region characteristic aggregation manner is an ROI Align manner of the mask region convolutional neural network.

In an optional embodiment, when scanning targets are teeth, tooth texture images of people in different ages can be collected. For example, the age range from 0 to 80 years old is divided into 8 groups according to each age group of 10 years old, and texture images with a male to female ratio of 1:1 are collected for each age group.

The specific definition of the apparatus for generating a three-dimensional model may refer to the above-mentioned definition of the method for generating a three-dimensional model, and will not be repeated here. Each module in the above-mentioned apparatus for generating a three-dimensional model can be implemented fully or partially by software, hardware and a combination thereof. Each of the above-mentioned modules can be embedded into or independent of a processor in a computer device in the form of hardware, or can be stored in a memory in the computer device in the form of software, so that the processor can call and execute the operation corresponding to each of the above-mentioned modules.

Figure 4:
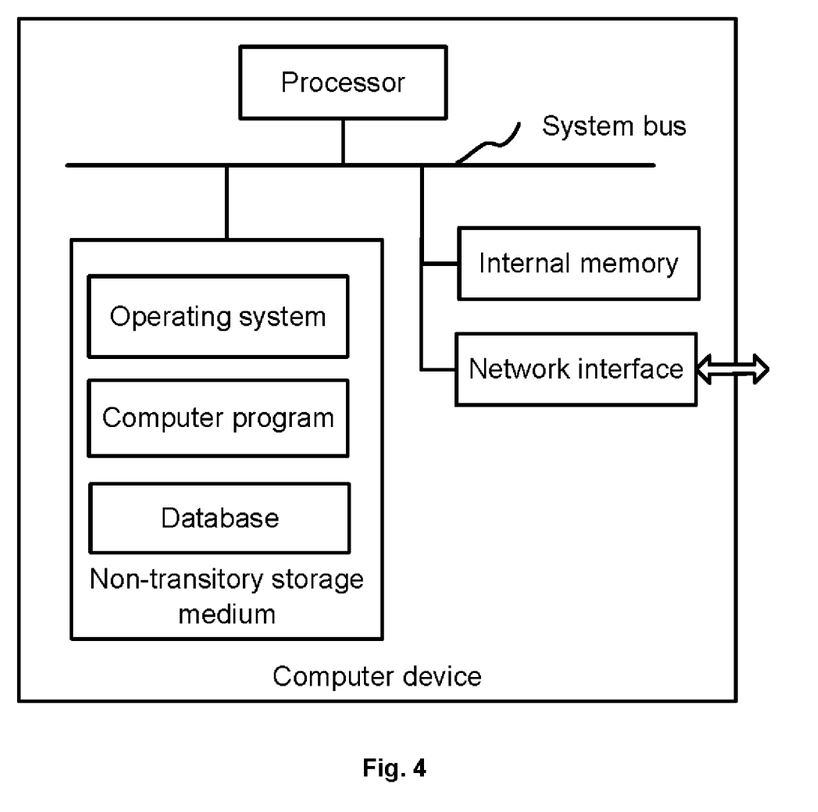
FIG. 4 is an internal structure diagram of a computer device in an embodiment of the present disclosure.

In an optional embodiment, a computer device is provided. The computer device may be a server, and the internal structure diagram of the computer device may be as shown in FIG. 4. The computer device includes a processor, a memory, a network interface and a database connected by a system bus. The processor of the computer device is configured to provide calculation and control capabilities. The memory of the computer device includes a non-transitory storage medium and an internal memory. The non-transitory storage medium stores an operating system, a computer program and a database. The internal memory provides an environment for operation of the operating system and the computer program in the non-transitory storage medium. The database of the computer device is configured to store a sample image set configured to train a mask region convolutional neural network. The network interface of the computer device is configured to communicate with an external terminal by network connection. The computer program is executed by the processor to implement a method for generating a three-dimensional model.

Those skilled in the art can understand that the structure shown in FIG. 4 is only a block diagram of a part of the structure related to the solution of the present disclosure, and does not constitute a limitation on the computer device on which the solution of the present disclosure should be set. A specific computer device may include more or fewer components than those shown in the figure, or combine some components, or have different component arrangements.

In an optional embodiment, a computer device is provided. The computer device includes a memory and a processor. The memory is configured to store a computer program, and the processor is configured to execute the computer program to implement the following steps:

acquiring a texture image and a depth image corresponding to the texture image;

processing the texture image by a pre-trained mask region convolutional neural network to determine at least one region of interest on the texture image and category information and mask information of each of the at least one region of interest;

updating the depth image according to the category information and the mask information of each of the at least one region of interest to obtain a updated depth image; and constructing a three-dimensional model corresponding to the updated depth image.

In an optional embodiment, when the processor executes the computer program to implement the following steps:

determining a region category of each of the at least one region of interest in the category information of each of the at least one region of interest;

when the region category is the positive sample category, acquiring a mask image of the region category in the mask information of each of the at least one region of interest, and determining the mask image of the region category as the mask image of each of the at least one region of interest; and updating the depth image according to the mask image of each of the at least one region of interest.

In an optional embodiment, when the processor executes the computer program to implement the following step:

when the region category is the negative sample category, clearing depth information corresponding to each of the at least one region of interest in the depth image.

In an optional embodiment, when the processor executes the computer program to implement the following steps:

acquiring remaining image regions in the texture image excluding the at least one region of interest; and clearing depth information corresponding to the remaining image regions in the depth image.

In an optional embodiment, when the processor executes the computer program to implement the following steps:

acquiring a sample image set, and labeling a sample image in the sample image set with a region type to obtain an image region of the preset category in the sample image;

inputting the sample image into the mask region convolutional neural network to determine at least one sample region of interest on the sample image and category information and mask information of each of the at least one sample region of interest; and training the mask region convolutional neural network according to the image region of the preset category in the sample image and the category information and the mask information of each of the at least one sample region of interest.

In an optional embodiment, when the processor executes the computer program to implement the following steps:

extracting a characteristic pattern of the sample image;

determining at least one proposal region on the characteristic pattern, and selecting the at least one sample region of interest from the at least one proposal region; and processing the at least one sample region of interest by a preset region characteristic aggregation manner and a preset fully connected convolutional neural network to generate the category information and the mask information of each of the at least one sample region of interest.

In an optional embodiment, a computer-readable storage medium is provided, and a computer program is stored on the computer-readable storage medium. When the computer program is executed by the processor, the following steps are implemented:

acquiring a texture image and a depth image corresponding to the texture image;

processing the texture image by a pre-trained mask region convolutional neural network to determine at least one region of interest on the texture image and category information and mask information of each of the at least one region of interest;

updating the depth image according to the category information and the mask information of each of the at least one region of interest to obtain a updated depth image; and constructing a three-dimensional model corresponding to the updated depth image.

In an optional embodiment, when the computer program is executed by the processor, the following steps are also implemented:

determining a region category of each of the at least one region of interest in the category information of each of the at least one region of interest;

when the region category is the positive sample category, acquiring a mask image of the region category in the mask information of each of the at least one region of interest, and determining the mask image of the region category as the mask image of each of the at least one region of interest; and updating the depth image according to the mask image of each of the at least one region of interest.

In an optional embodiment, when the computer program is executed by the processor, the following step is also implemented:

when the region category is the negative sample category, clearing depth information corresponding to each of the at least one region of interest in the depth image.

In an optional embodiment, when the computer program is executed by the processor, the following steps are also implemented:

acquiring remaining image regions in the texture image excluding the at least one region of interest; and clearing depth information corresponding to the remaining image regions in the depth image.

In an optional embodiment, when the computer program is executed by the processor, the following steps are also implemented:

acquiring a sample image set, and labeling a sample image in the sample image set with a region type to obtain an image region of the preset category in the sample image;

inputting the sample image into the mask region convolutional neural network to determine at least one sample region of interest on the sample image and category information and mask information of each of the at least one sample region of interest; and training the mask region convolutional neural network according to the image region of the preset category in the sample image and the category information and the mask information of each of the at least one sample region of interest.

In an optional embodiment, when the computer program is executed by the processor, the following steps are also implemented:

extracting a characteristic pattern of the sample image;

determining at least one proposal region on the characteristic pattern, and selecting the at least one sample region of interest from the at least one proposal region; and processing the at least one sample region of interest by a preset region characteristic aggregation manner and a preset fully connected convolutional neural network to generate the category information and the mask information of each of the at least one sample region of interest.

Those of ordinary skill in the art may understand that all or some flows in the foregoing method embodiment may be completed by instructing related hardware via a computer program, the computer program may be stored in a non-transitory computer-readable storage medium, and when the computer program is executed, the flow in each of the foregoing method embodiments may be included. Any reference to memories, storage, databases or other media used in the embodiments provided in the present disclosure may include non-transitory and/or transitory memories. The non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) or an external cache memory. As descriptions other than limitations, the RAM may be obtained in many forms such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), a Rambus dynamic RAM (RDRAM), and the like.

Various technical features in the foregoing embodiments may be randomly combined. For ease of simple description, not all possible combinations of various technical features in the foregoing embodiments are described. However, as long as the combinations of these technical features do not contradict, they should be regarded as falling within the scope of the present specification.

The foregoing embodiments describe several implementations of the present disclosure, and the description is specific and detailed, but cannot therefore be understood as a limitation to the patent scope of the present disclosure. It should be noted that a person of ordinary skill in the art may further make several variations and improvements without departing from the conception of the present disclosure, and these all fall within the protection scope of the present disclosure. Therefore, the patent protection scope of the present disclosure should be subject to the appended claims.

INDUSTRIAL APPLICABILITY

The solution provided by the embodiments of the present disclosure can be applied to the three-dimensional scanning process. The embodiments of the present disclosure solve the technical problem of lower accuracy of the three-dimensional model, improve the effect of noise data removal in the depth image, and improve the accuracy of the three-dimensional model.

What is claimed is:

1. A method for generating a three-dimensional model, comprising:

acquiring a texture image and a depth image corresponding to the texture image;

processing the texture image by a pre-trained mask region convolutional neural network to determine at least one region of interest on the texture image and category information and mask information of each of the at least one region of interest;

updating the depth image according to the category information and the mask information of each of the at least one region of interest to obtain a updated depth image, wherein the category information of each of the at least one region of interest comprises a category value of each preset category; and updating the depth image according to the category information and the mask information of each of the at least one region of interest to obtain a updated depth image comprises:

determining the preset category to which each of the at least one region of interest belongs according to the category value of each preset category, wherein each preset category comprises a positive sample category and a negative sample category;

acquiring the mask image of each region category from the mask information of each of the at least one region of interest;

updating the depth information corresponding to each of the at least one region of interest on the depth image according to the region category of each of the at least one region of interest and the mask image of each of the at least one region of interest to remove the depth information corresponding to each region of interest belonging to the negative sample category, acquiring an updated depth image, wherein the updated depth image comprises the depth information of each region of interest belonging to the positive sample category;

constructing a three-dimensional model corresponding to the updated depth image.

2. The method as claimed in claim 1, wherein updating the depth image according to the category information and the mask information of each of the at least one region of interest comprises:

determining a region category of each of the at least one region of interest in the category information of each of the at least one region of interest;

when the region category is the positive sample category, acquiring a mask image of the region category in the mask information of each of the at least one region of interest, and determining the mask image of the region category as the mask image of each of the at least one region of interest; and updating the depth image according to the mask image of each of the at least one region of interest.

3. The method as claimed in claim 2, wherein updating the depth image according to the category information and the mask information of each of the at least one region of interest further comprises:

when the region category is the negative sample category, clearing depth information corresponding to each of the at least one region of interest in the depth image.

4. The method as claimed in claim 2, wherein updating the depth image according to the category information and the mask information of each of the at least one region of interest further comprises:

acquiring remaining image regions in the texture image excluding the at least one region of interest; and clearing depth information corresponding to the remaining image regions in the depth image.

5. The method as claimed in claim 1, wherein before acquiring the texture image and the depth image corresponding to the texture image, the method further comprises:
  acquiring a sample image set, and labelling a sample image in the sample image set with a region type to obtain an image region of the preset category in the sample image;
  inputting the sample image into the mask region convolutional neural network to determine at least one sample region of interest on the sample image and category information and mask information of each of the at least one sample region of interest; and
  training the mask region convolutional neural network according to the image region of the preset category in the sample image and the category information and the mask information of each of the at least one sample region of interest.

6. The method as claimed in claim 5, wherein determining the at least one sample region of interest on the sample image and the category information and the mask information of each of the at least one sample region of interest comprises:
  extracting a characteristic pattern of the sample image;
  determining at least one proposal region on the characteristic pattern, and selecting the at least one sample region of interest from the at least one proposal region; and
  processing the at least one sample region of interest by a preset region characteristic aggregation manner and a preset fully connected convolutional neural network to generate the category information and the mask information of each of the at least one sample region of interest.

7. The method as claimed in claim 1, wherein texture information of a scanning target is recorded on the texture image.

8. The method as claimed in claim 1, wherein depth information corresponding to each pixel point on the texture image is recorded on the depth image.

9. The method as claimed in claim 1, wherein whether each of the at least one region of interest belongs to the preset category is determined according to the category value of each preset category.

10. The method as claimed in claim 1, wherein the mask image of each preset category is a binary mask image.

11. The method as claimed in claim 1, wherein each region of interest belonging to the positive sample category comprises useful data for constructing the three-dimensional model, and each region of interest belonging to the negative sample category comprises noise data that interferes with the three-dimensional model.

12. The method as claimed in claim 1, wherein the category value of each preset category is 0 or 1.

13. The method as claimed in claim 12, wherein when the category value of any one preset category corresponding to a region of interest is 0, it is considered that the region of interest does not belong to this preset category.

14. The method as claimed in claim 12, wherein when the category value of any one preset category corresponding to a region of interest is 1, it is considered that the region of interest belongs to this preset category.

15. The method as claimed in claim 1, wherein when the region category of one region of interest is the positive sample category, a mask operation is performed on the mask image and the depth image of this region of interest to obtain the updated depth image.

16. The method as claimed in claim 15, wherein the mask operation is used for multiplying a mask value of one region in the mask image with a depth value of this region in the depth image.

17. A computer device, comprising a memory and a processor, wherein the memory is configured to store a computer program, and the processor is configured to execute the computer program to implement the following steps:
  acquiring a texture image and a depth image corresponding to the texture image;
  processing the texture image by a pre-trained mask region convolutional neural network to determine at least one region of interest on the texture image and category information and mask information of each of the at least one region of interest;
  updating the depth image according to the category information and the mask information of each of the at least one region of interest to obtain a updated depth image, wherein the category information of each of the at least one region of interest comprises a category value of each preset category; and
  updating the depth image according to the category information and the mask information of each of the at least one region of interest to obtain a updated depth image comprises:
  determining the preset category to which each of the at least one region of interest belongs according to the category value of each preset category, wherein each preset category comprises a positive sample category and a negative sample category;
  acquiring the mask image of each region category from the mask information of each of the at least one region of interest;
  updating the depth information corresponding to each of the at least one region of interest on the depth image according to the region category of each of the at least one region of interest and the mask image of each of the at least one region of interest to remove the depth information corresponding to each region of interest belonging to the negative sample category, acquiring an updated depth image, wherein the updated depth image comprises the depth information of each region of interest belonging to the positive sample category;
  constructing a three-dimensional model corresponding to the updated depth image.

18. A non-transitory storage medium, wherein a computer program is stored on the non-transitory storage medium, when the computer program is executed by a processor, the following steps are implemented:
  acquiring a texture image and a depth image corresponding to the texture image;
  processing the texture image by a pre-trained mask region convolutional neural network to determine at least one region of interest on the texture image and category information and mask information of each of the at least one region of interest;
  updating the depth image according to the category information and the mask information of each of the at least one region of interest to obtain a updated depth image, wherein the category information of each of the at least one region of interest comprises a category value of each preset category; and
  updating the depth image according to the category information and the mask information of each of the at least one region of interest to obtain a updated depth image comprises:

determining the preset category to which each of the at least one region of interest belongs according to the category value of each preset category, wherein each preset category comprises a positive sample category and a negative sample category;

acquiring the mask image of each region category from the mask information of each of the at least one region of interest;

updating the depth information corresponding to each of the at least one region of interest on the depth image according to the region category of each of the at least one region of interest and the mask image of each of the at least one region of interest to remove the depth information corresponding to each region of interest belonging to the negative sample category, acquiring an updated depth image, wherein the updated depth image comprises the depth information of each region of interest belonging to the positive sample category;

constructing a three-dimensional model corresponding to the updated depth image.

* * * * *